(12) United States Patent
Appiah et al.

(10) Patent No.: US 9,672,024 B2
(45) Date of Patent: *Jun. 6, 2017

(54) TECHNIQUES FOR AUTOMATIC SOFTWARE PROVISIONING

(71) Applicant: MICROSOFT TECHNOLOGY LICENSING, LLC, Redmond, WA (US)

(72) Inventors: Madan Appiah, Redmond, WA (US); Subramanian Chandrasekaran, Redmond, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/198,897

(22) Filed: Mar. 6, 2014

(65) Prior Publication Data

US 2014/0317613 A1 Oct. 23, 2014

Related U.S. Application Data

(63) Continuation of application No. 11/823,428, filed on Jun. 27, 2007, now Pat. No. 8,701,102.

(51) Int. Cl.
*G06F 9/44* (2006.01)
*G06F 9/445* (2006.01)

(52) U.S. Cl.
CPC . *G06F 8/65* (2013.01); *G06F 8/68* (2013.01)

(58) Field of Classification Search
CPC .................. G06F 8/65; G06F 8/71; G06F 8/68
(Continued)

(56) References Cited

U.S. PATENT DOCUMENTS 6,151,643 A 11/2000 Cheng et al.
6,760,324 B1 7/2004 Scott et al.
(Continued)

FOREIGN PATENT DOCUMENTS

CN 1777317 5/2006
JP 2001005671 1/2001
(Continued)

OTHER PUBLICATIONS

"Cisco Unified IP Phone 7971G-GE", (2006) 5 pages, USA.
(Continued)

*Primary Examiner* — Ted T Vo (57) ABSTRACT

Techniques to perform automatic software provisioning are described. An apparatus may comprise a provisioning database, a client provisioning module and a network interface. The provisioning server may be operative to store software update packages for different packet telephony devices. The client provisioning module may be operative to automatically provision packet telephony devices in response to provisioning requests from the packet telephony devices. For example, the client provisioning module may receive device configuration information for a packet telephony device, and retrieve a software update package from the provisioning database based on the device configuration information. The network interface may send the software update package to the packet telephony device on behalf of the client provisioning module. Other embodiments are described and claimed.

20 Claims, 4 Drawing Sheets

(58) Field of Classification Search
USPC .................................................. 717/168–178
See application file for complete search history.

(56) References Cited

U.S. PATENT DOCUMENTS

| | | | |
|---|---|---|---|
| 8,209,676 B2* | 6/2012 | Kapadekar et al. | 717/171 |
| 8,701,102 B2* | 4/2014 | Appiah et al. | 717/171 |
| 2004/0015886 A1 | 1/2004 | Aaltonen et al. | |
| 2004/0107417 A1 | 6/2004 | Chia et al. | |
| 2004/0261073 A1 | 12/2004 | Herle et al. | |
| 2005/0170827 A1 | 8/2005 | Nagashima | |
| 2005/0180403 A1 | 8/2005 | Haddad et al. | |
| 2005/0207432 A1 | 9/2005 | Velez-Rivera et al. | |
| 2005/0223374 A1 | 10/2005 | Wishart et al. | |
| 2005/0246703 A1 | 11/2005 | Ahonen | |
| 2006/0050686 A1 | 3/2006 | Velez-Rivera et al. | |
| 2007/0008893 A1 | 1/2007 | Singh et al. | |
| 2007/0011610 A1 | 1/2007 | Sethi et al. | |
| 2007/0028120 A1 | 2/2007 | Wysocki et al. | |
| 2007/0036099 A1 | 2/2007 | Maria et al. | |
| 2008/0177998 A1 | 7/2008 | Apsangi et al. | |

FOREIGN PATENT DOCUMENTS

| | | |
|---|---|---|
| JP | 2004272424 | 9/2004 |
| JP | 2004355596 | 12/2004 |
| JP | 2005026993 | 1/2005 |
| JP | 2005210183 | 8/2005 |
| JP | 2007128521 | 5/2007 |
| WO | 9716938 | 5/1997 |
| WO | 2006110005 | 10/2006 |

OTHER PUBLICATIONS

"VoIP & Unified Messaging Solution Brief" (2006), pp. 1-7.
Incognito Software, "Key Elements of a Successful SIP Device Provisioning System", Apr. 2006, incognito Software Inc, 6 pages.
Cisco, "Cisco SIP Proxy Server Administrator Guide", 2003, Cisco Systems, Version 2.1, 238 pages.
Dang et al., "PracticalVoIP Using Vocal", 2002, O'Reilly Media inc., Chapters 4-6, 19, 145 pages.
European Search Report received for European Patent Application No. 08771106.5, mailed Jul. 18, 2012, 5 pages.
International Search Report for PCT/US2008/067018, mailed Dec. 12, 2008, 2 pages.
"Office Action Received for European Patent Application No. 08771106.5", Mailed Date: Aug. 20, 2015, 4 Pages.

* cited by examiner

TECHNIQUES FOR AUTOMATIC SOFTWARE PROVISIONING

CROSS-REFERENCE TO RELATED APPLICATION

The application is a continuation of, claims the benefit of and priority to, previously filed U.S. patent application Ser. No. 11/823,428 entitled "Techniques for Automatic Software Provisioning" filed on Jun. 27, 2007, the subject matter of which is hereby incorporated by reference in its entirety.

BACKGROUND

Packet networks are increasingly being used for voice communications. The emergence of Voice Over Internet Protocol (VoIP) and Voice Over Packet (VOP) technologies have promoted development of various end point devices, such as packet telephones capable of communicating voice information over a packet network. Such end point devices, however, are typically made by different phone vendors to work with a specific IP telephony phone solution, which may include proprietary hardware platforms, software applications and communications protocols. Furthermore, software applications have a much shorter development cycle than hardware platforms. As a result, many end point devices are typically updated with different versions of software applications over time even though the underlying hardware platform remains the same. The software updates, however, often need to be individually and manually performed due to the wide variety of phone vendors and end point devices, as well as the tight integration between a given IP telephony solution and the end point device. Such manual provisioning may increase the total cost of ownership dramatically. Consequently, there may be substantial need for improvements in software update techniques to solve these and other problems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be generally directed to wired and wireless communications systems. Some embodiments may be particularly directed to communications systems for performing automatic software provisioning for various types of packet telephony devices, such as a packet telephone. In one embodiment, for example, an apparatus such as a provisioning server may comprise a provisioning database, a client provisioning module and a network interface. The provisioning server may be operative to store software update packages for different packet telephony devices. The client provisioning module may be operative to automatically provision packet telephony devices in response to provisioning requests from the packet telephony devices. For example, the client provisioning module may receive device configuration information for a packet telephony device, and retrieve a software update package from the provisioning database based on the device configuration information. The network interface may send the software update package to the packet telephony device on behalf of the client provisioning module. In this manner, a packet telephony device may be automatically provisioned while reducing or eliminating the need for manual operations in preparing the packet telephony device for normal operations. Other embodiments are described and claimed.

DETAILED DESCRIPTION

Various embodiments may comprise one or more elements. An element may comprise any feature, characteristic, structure or operation described in connection with an embodiment. Examples of elements may include hardware elements, software elements, physical elements, or any combination thereof. Although an embodiment may be described with a limited number of elements in a certain arrangement by way of example, the embodiment may include more or less elements in alternate arrangements as desired for a given implementation. It is worthy to note that any references to "one embodiment" or "an embodiment" or similar language are not necessarily referring to the same embodiment.

Various embodiments may be generally directed to communications systems for performing automatic software provisioning for various types of packet telephony devices, such as a packet telephone. A communications system may include a provisioning server arranged to manage and perform automatic software provisioning for various types of communications devices. The provisioning server may include a provisioning module and a provisioning database. The provisioning module may manage provisioning operations for the provisioning server while provisioning various communications devices with software updates. The provisioning database may store multiple software update packages. The software update packages may each correspond to a particular communications device. Whenever a communications device connects to the provisioning server, the provisioning server performs an analysis to determine whether the communications device needs a software update. When the communications device needs a software update, the provisioning server retrieves the appropriate software update package from the provisioning database. The provisioning server may then send the retrieved software update package to the requesting communications device. In this manner, packet telephony devices may be automatically provisioned with the appropriate software components while reducing or eliminating manual operations needed by an operator or system administrator.

Figure 1:
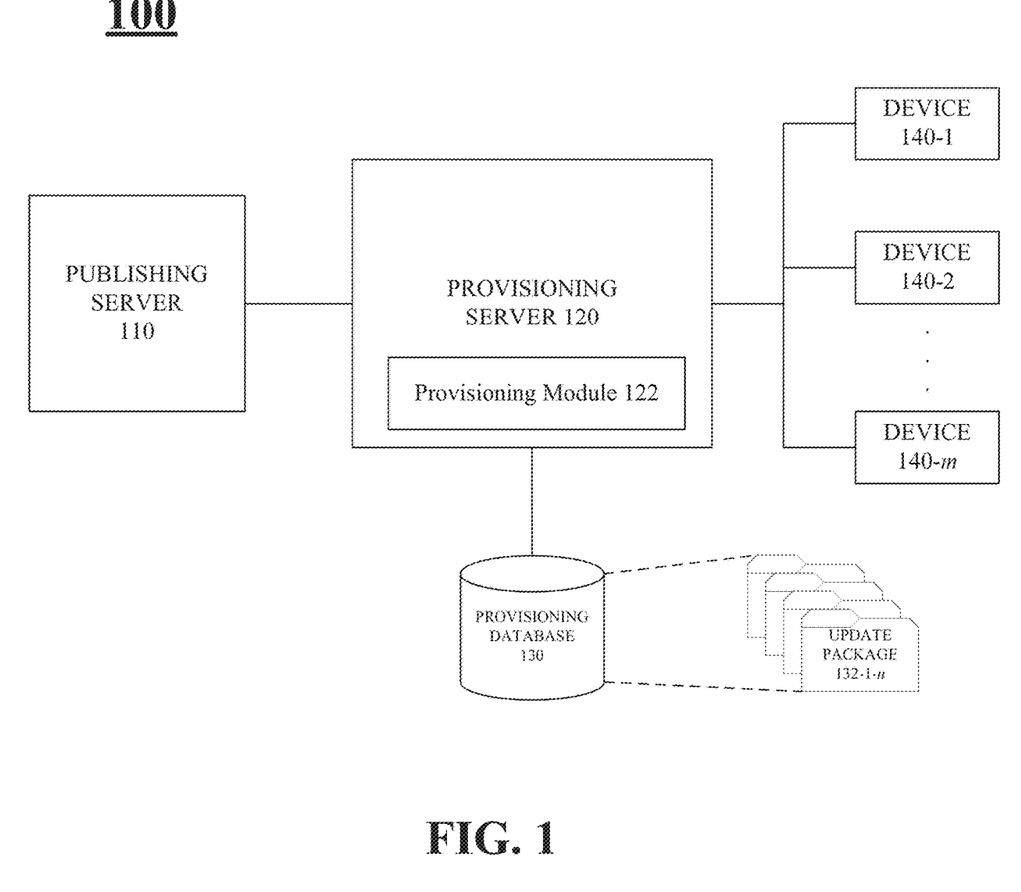
FIG. 1 illustrates one embodiment of a communications system.

FIG. 1 illustrates a block diagram of a communications system 100. In various embodiments, the communications system 100 may be implemented as a wireless communication system, a wired communication system, or a combination of both. When implemented as a wireless communication system, communications system 100 may include components and interfaces suitable for communicating over wireless communications media, such as one or more antennas, transmitters, receivers, transceivers, amplifiers, filters, control logic, and so forth. An example of the communications media may include a wireless shared media implemented using portions of a wireless spectrum, such as the radio-frequency (RF) spectrum and so forth. When implemented as a wired communications system, communications system 100 may include components and interfaces suitable for communicating over wired communications media, such as input/output (I/O) adapters, physical connectors to connect the I/O adapter with a corresponding wired communications medium, network interfaces, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

As shown in the illustrated embodiment of FIG. 1, the communications system 100 may include a publishing server 110, a provisioning server 120, a provisioning database 130, and multiple devices 140-1-$m$. The provisioning server 120 may further include a provisioning module 122. Although FIG. 1 illustrates a limited number of elements in a given topology, it may be appreciated that the communications system 100 may include more or less elements in different topologies and still fall within the scope of the embodiments. The embodiments are not limited in this context.

In one embodiment, the communications system 100 may include various communications devices 140-1-$m$. The communications devices 140-1-$m$ may comprise any electronic device arranged to communicate information over a packet network, such as an IP network or the Internet. Examples for the communications devices 140-1-$m$ may include a telephone, a packet telephone, a VoIP telephone, a VOP telephone, a digital telephone, a computer, a laptop computer, a portable computer, a handheld computer, a server, consumer electronics, and so forth. In one embodiment, the communications devices 140-1-$m$ may comprise packet telephony devices operative for communicating voice information over a packet network. An example of a packet telephony device may comprise a packet telephone capable of implementing a VoIP protocol, such as a signaling protocol as defined and promulgated by the Internet Engineering Task Force (IETF) standards organization, such as the Session Initiation Protocol (SIP) as defined by the IETF series RFC 3261, 3265, 3853, 4320 and progeny, revisions and variants. In general, the SIP signaling protocol is an application-layer control and/or signaling protocol for creating, modifying, and terminating sessions with one or more participants. These sessions include IP telephone calls, multimedia distribution, and multimedia conferences. The packet telephone may also implement a data format protocol, such as the Real-time Transport Protocol (RTP) as defined by the IETF RFC 3550 and progeny, revisions and variants. The RTP standard defines a uniform or standardized packet format for delivering multimedia information (e.g., audio and video) over a packet network. Although some embodiments may be described using a packet telephone by way of example and not limitation, it may be appreciated that other electronic communications devices may also be used in the communications system 100 and still fall within the scope of the embodiments.

In one embodiment, the communications system 100 may include the provisioning server 120. The provisioning server 120 may be arranged to manage and perform automatic software provisioning for various types of communications devices, such as the communications devices 140-1-$m$. The provisioning server 120 may include, or have access to, a provisioning module 122 and a provisioning database 130. The provisioning module 122 may manage provisioning operations for the provisioning server 120 while provisioning the communications devices 140-1-$m$ with software updates. The provisioning database 130 may store multiple software update packages or files 132-1-$n$. The software update packages or files 132-1-$n$ may each correspond to a particular communications device 140-1-$m$. Whenever a communications device 140-1-$m$ connects to the provisioning server 120, the provisioning server 120 performs an analysis to determine whether the communications device 140-1-$m$ needs a software update. When the communications device 140-1-$m$ needs a software update, the provisioning server 120 retrieves the appropriate software update package 132-1-$n$ from the provisioning database 130. The provisioning server 120 may then send the retrieved software update package 132-1-$n$ to the requesting communications device 140-1-$m$. The requesting communications device 140-1-$m$ may receive the software update package 132-1-$n$ from the provisioning server 120, and install the software update package 132-1-$n$ on the communications device 140-1-$m$ using a standard installer present on the communications device 140-1-$m$, or a self-extracting file and installer contained within the software update package 132-1-$n$.

In one embodiment, for example, the provisioning server 120 may be implemented as a MICROSOFT® OFFICE LIVE COMMUNICATIONS SERVER, made by MICROSOFT CORPORATION, Redmond, Wash. The MICROSOFT OFFICE LIVE COMMUNICATIONS SERVER comprises an enterprise real-time communications server. The MICROSOFT OFFICE LIVE COMMUNICATIONS SERVER is designed to manage and facilitate communications between various devices, such as the communications devices 140-1-$m$ and the publishing server 110. For example, the MICROSOFT OFFICE LIVE COMMUNICATIONS SERVER may be arranged to provide and manage communications connections and sessions between client applications such as MICROSOFT OFFICE COMMUNICATOR CLIENT implemented by the communications device 140-1-$m$ and the provisioning server 120.

In one embodiment, the communications system 100 may include the publishing server 110. The publishing server 110 may be arranged to publish and distribute software update packages 132-1-$n$ for various communications devices 140-1-$m$. The publishing server 110 may represent a central publishing authority for all certified software updates for the communications devices 140-1-$m$. Having a central publishing authority ensures that the latest version of a software application is available for distribution, and controls the manner in which the software updates are distributed. In one embodiment, for example, the publishing server 110 may comprise a MICROSOFT WINDOWS® SERVER UPDATE SERVICES (WSUS) server. The WSUS server 110 allows network administrators to fully manage the distribution of software updates for a given device within a network or system.

In various embodiments, the provisioning server 120 may receive or retrieve the software update packages 132-1-$n$ from the publishing server 110 either before or after a provisioning request is received by the provisioning server 120 from a requesting communications device 140-1-$m$. The latter scenario may be desirable in the event the provisioning server 120 does not have an appropriate software update package 132-1-$n$ for the type identity of the requesting communications device 140-1-$m$ stored locally by the provisioning database 130. In this case, the provisioning server 120 may perform real-time searches for the appropriate software update package 132-1-$n$ in response to demands by a requesting communications device 140-1-$m$.

In various embodiments, the provisioning server 120 may test and validate a software update package 132-1-*n* prior to distributing to the requesting communications devices 140-1-*m*. For example, the provisioning server 120 may have approval authority to test and validate one or more software update packages 132-1-*n* as they are received from the publishing server 110. In this manner, the provisioning server 120 may ensure that the software update packages 132-1-*n* are fully operational prior to sending the software update packages 132-1-*n* from the provisioning server to the communications devices 140-1-*m* (e.g., a packet telephony device) for installation on the packet telephony device.

In general operation, the provisioning server 120 may periodically receive software update packages from the publishing server 110 for various communications devices 140-1-*m*. The publishing server 110 may push software updates to the provisioning server 120 when ready, or provide the software updates in response to a request by the provisioning server 120. Similarly, the provisioning server 120 may push software updates to the communications device 140-1-*m*, or provide the software updates in response to a request by the communications devices 140-1-*m*. When providing software updates in response to an explicit request, such operations are sometimes referred to as "pull" operations.

By way of example, assume an enterprise end user Bob receives a new IP telephone 140-1 through the corporate delivery system. The information technology (IT) administrator of the enterprise does not need to be aware of any specific information about the IP telephone 140-1, such as the media access control (MAC) address, serial number, and so forth. Rather, Bob simply connects the IP telephone 140-1 to a network port (e.g., an Ethernet port) and powers on the new IP telephone. Whenever the IP telephone 140-1 connects and registers with the provisioning server 120, the provisioning server 120 may discover device configuration information for the IP telephone 140-1, and apply the appropriate software update 132-1 to the IP telephone 140-1 based on the device configuration information. The software update 132-1 may have been previously downloaded from the publishing server 110 to the provisioning server 120 in anticipation of the provisioning for the IP telephone 140-1. As a result, there is no need for Bob or an IT administrator to manually provision the IP telephone 140-1. Thereafter, critical updates may be pulled from the provisioning server 120 by the IP telephone 140-1, or pushed to the IP telephone 140-1 by the provisioning server 120, when needed. The communications system 100 in general, and the provisioning server 120 in particular, may be described in more detail with reference to FIGS. 2-4.

Figure 2:
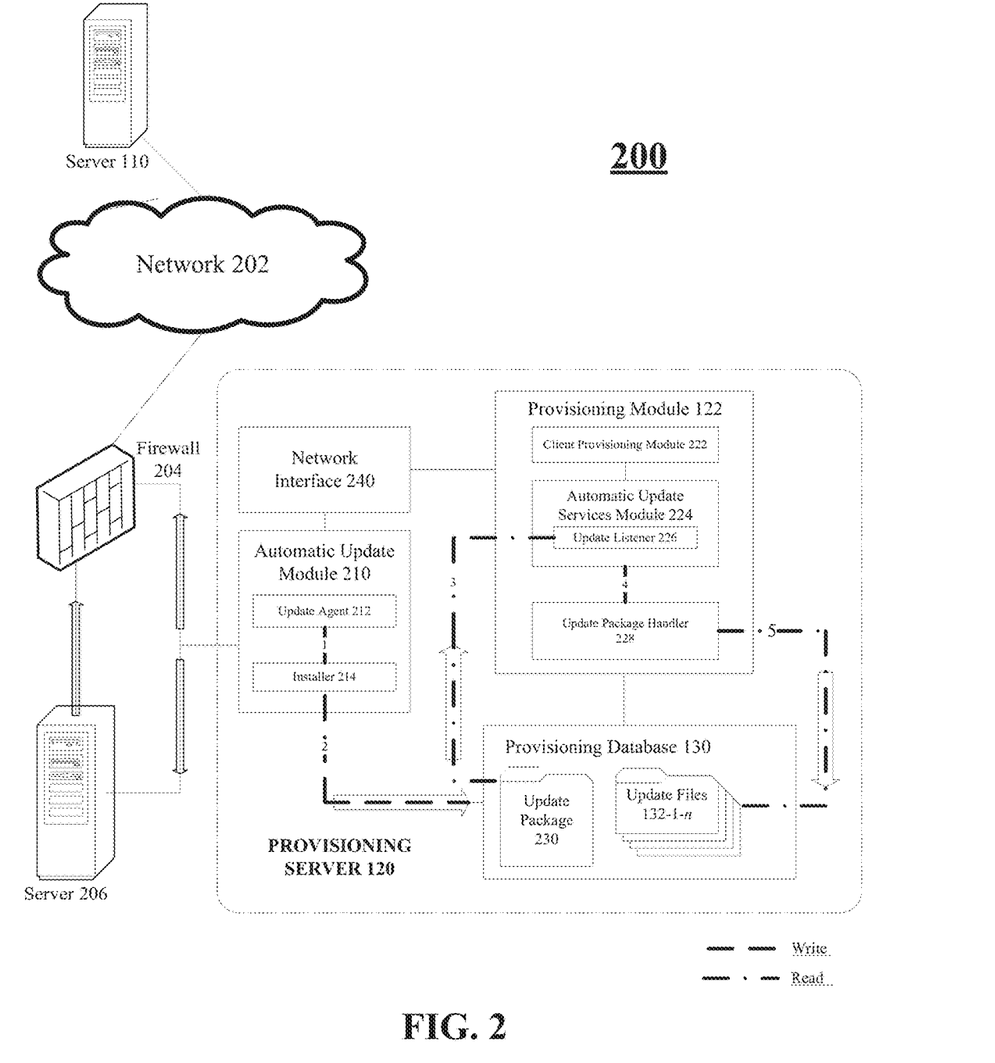
FIG. 2 illustrates one embodiment of provisioning server.

FIG. 2 illustrates a more detailed block diagram for the provisioning server 120. In order to provision the communications devices 140-1-*m*, the provisioning server 120 may periodically receive software updates for the communications devices 140-1-*m* from a publishing authority, such as the publishing server 110. As shown in FIG. 2, the provisioning server 120 may comprise an automatic update module 210, a provisioning module 122, the provisioning database 130 and a network interface 240. Although FIG. 2 illustrates a limited number of elements in a given topology, it may be appreciated that the provisioning server 120 may include more or less elements in different topologies and still fall within the scope of the embodiments. For example, the provisioning server 120 may include a processing system comprising a processor and memory, as described in more detail with reference to FIG. 4.

In one embodiment, the provisioning server 120 may include the automatic update module 210. The automatic update module 210 may further comprise an update agent 212 and an installer 214. The update agent 212 may be arranged to receive a software update package 230 from the publishing server 110 via a network 202 and corporate firewall 204. In some cases, the update agent 212 may receive a software update package 230 from a different publishing authority other than the publishing server 110, such as a WINDOWS UPDATES SERVICES server 206. Once the update agent 212 receives the software update package 230 from the appropriate update service, the installer 214 may be arranged to extract and install the update package 230 in the provisioning database 130. In one embodiment, the installer 214 may comprise a self-extracting installer. Once the installer 214 installs the update package 230 in the provisioning database 130, the installer 214 may notify an automatic update services module 222 of the installation.

In one embodiment, the provisioning server 120 may include the provisioning module 122. The provisioning module 122 may generally manage the update and provisioning operations between the publishing authority (e.g., the publishing servers 110, 206) and the provisioning server 120, as well as between the provisioning server 120 and the communications devices 140-1-*m*. The provisioning module 122 may further comprise a client provisioning module 222, an automatic update services module 224, and an update package handler 228. The automatic update services module 224 may further comprise an update listener 226.

In various embodiments, the client provisioning module 222 may be communicatively coupled to the provisioning database 130 and the network interface 240. The client provisioning module 222 may be operative to automatically provision packet telephony devices in response to provisioning requests from the packet telephony devices as previously described. For example, the client provisioning module 222 may receive device configuration information for a particular packet telephony device (140-1-*m*), and retrieve a software update package 132-1-*n* from the provisioning database 130 based on the device configuration information. The client provisioning module 222 may send the software update package 132-1-*n* to the requesting communications device 140-1-*m* via the network interface 240.

In various embodiments, the client provisioning module 222 of the provisioning server 120 may perform provisioning operations using the appropriate software update packages 132-1-*n* based on device configuration information for the communications device 140-1-*m*. For example, a communications device 140-1-*m* may send a provisioning request to the provisioning server 120. The communications device 140-1-*m* may send device configuration information for the communications device 140-1-*m* together with, or separate from, the provisioning request. The client provisioning module 222 of the provisioning server 120 may receive the device configuration information and use the device configuration information to determine whether the communications device 140-1-*m* requires a software update, and if so, which software update package 132-1-*n* to use for the software updates.

In various embodiments, the device configuration information may comprise any information about a communications device which may be used to uniquely identify the communications device and its current configuration. For example, the device configuration information may include two types of information for a packet telephony device, such as type identification information and component version information. Type identification information may be used to uniquely identify a packet telephony device, such as a communications device 140-1-*m*. Examples for type identification information may include a type identifier, a vendor identifier, a model identifier, a hardware revision identifier or a locale identifier. Component version information may be used to identify software components for a packet telephony device, such as a communications device 140-1-*m*. Examples for component version information may include a file major version identifier, a file minor version identifier, a file build identifier or a file quick fix engineering (QFE) identifier. Other types of device configuration information may also be used in addition to, or in lieu of, the previous examples as desired for a given implementation.

By way of example, assume a communications device 140-1 requires provisioning. The communications device 140-1 contacts the provisioning server 120 periodically through Hypertext Transfer Protocol (HTTP) or secure HTTP (HTTPS) calls to check if a software update is available. The provisioning request may include device configuration information, including type identification information and component version information for the communications device 140-1. Examples of the type identification information for the communications device 140-1 may be shown in Table 1 as follows:

TABLE 1

| Type Identification Information Field | Description |
| --- | --- |
| type identifier | Identifier for the class or type of a communications device, such as Unified Communications (UC) telephone. |
| vendor identifier | Identifier for a particular vendor for a communications device. |
| model identifier | Identifier for a particular model for a communications device. |
| hardware revision identifier | Identifier for a current hardware platform and drivers for a communications device. |
| locale identifier | Identifier for the locale and language for a communications device. |

Examples of the component version information for the communications device 140-1 may be shown in Table 2 as follows:

TABLE 2

| Component Version Information Field | Description |
| --- | --- |
| file major version identifier | Identifier for major software components of a communications device, including system programs such as an operating system and communications protocol stack. |
| file minor version identifier | Identifier for minor software components of a communications device, including application programs. |
| file build identifier | Identifier for a particular software build version for a communications device. |
| QFE identifier | Identifier for any QFE or hotfix for software components of a communications device. |

Given the type identification information of the communications device 140-1 and the component version information regarding the various updateable file components, the provisioning module 122 of the provisioning server 120 determines if the requesting communications device 140-1 needs a software update or upgrade. If the provisioning database 130 stores an approved version different from that of the requesting communications device 140-1, then the provisioning module 122 may reply to the request with links to where the new updates can be downloaded.

In various embodiments, the automatic update services module 224 and an update package handler 228 may be communicatively coupled to the automatic update module 210 and the provisioning database 130. The automatic update services module 224 may be arranged to manage update operations between the publishing authority (e.g., the publishing servers 110, 206) and the provisioning server 120. The automatic update services module 224 may include an update listener 226. The update listener 226 may receive notifications of installation of update packages, such as the update package 230, from the installer 214 of the automatic update module 210. The update listener 226 may in turn notify the update package handler 228 of the newly arrived update package 230 and its location in the provisioning database 130. The update package handler 228 may be arranged to extract an update file 132-1-*n* from the update package 230, and stores the update file 132-1-*n* in the provisioning database 130. The update package handler 228 may organize the update files 132-1-*n* within the provisioning database 130 according to the various supported device types of the communications devices 140-1-*m*.

Operations for the communications system 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more elements of the communications system 100 or alternative elements as desired for a given set of design and performance constraints.

Figure 3:
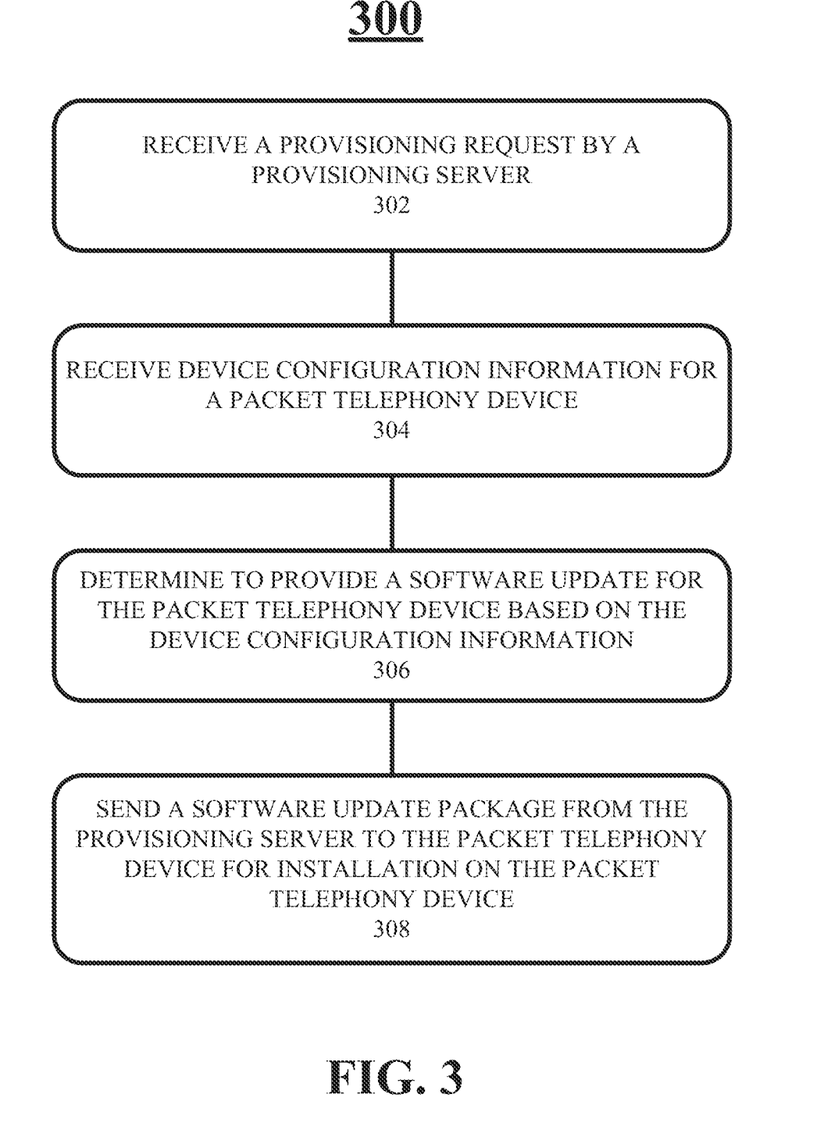
FIG. 3 illustrates one embodiment of a logic flow.

FIG. 3 illustrates a logic flow 300. Logic flow 300 may be representative of the operations executed by one or more embodiments described herein. As shown in FIG. 3, the logic flow 300 may receive a provisioning request by a provisioning server at block 302. The logic flow 300 may receive device configuration information for a packet telephony device at block 304. The logic flow 300 may determine to provide a software update for the packet telephony device based on the device configuration information at block 306. The logic flow 300 may send a software update package from the provisioning server to the packet telephony device for installation on the packet telephony device at block 308. The embodiments are not limited in this context.

In one embodiment, the logic flow 300 may receive a provisioning request by a provisioning server at block 302. For example, the client provisioning module 222 of the provisioning module 122 may receive a provisioning request from a communications device 140-1-*m*.

In one embodiment, the logic flow 300 may receive device configuration information for a packet telephony device at block 304. For example, the client provisioning module 222 may receive device configuration information for the requesting communications device 140-1-*m*. The device configuration information may include type identification information and component version information for the requesting communications device 140-1-*m*. The device configuration information may be included with the provisioning request, or may be sent as a separate message from the communications device 140-1-*m* to the provisioning server 120.

In one embodiment, the logic flow 300 may determine to provide a software update for the packet telephony device based on the device configuration information at block 306. For example, the client provisioning module 222 may use the device configuration information to determine whether the requesting communications device 140-1-$m$ requires a software update. The client provisioning module 222 may use the type identification information to search the provisioning database 130 for a software update package or file 132-1-$n$ corresponding to the device configuration information. The client provisioning module 222 may then begin comparing the various identification field values from the component version information with corresponding field values stored in the provisioning database 130. If the provisioning database 130 includes a software update package 132-1-$n$ with one or more versions of the software components already installed on the requesting communications device 140-1-$m$, and the software update package 132-1-$n$ has more recent versions of the software components, then the client provisioning module 222 may determine that the communications device 140-1-$m$ requires a software update. If the provisioning database 130 does not include a software update package 132-1-$n$ with one or more versions of the software components already installed on the requesting communications device 140-1-$m$, or the software update package 132-1-$n$ has the same or older versions of the software components, then the client provisioning module 222 may determine that the communications device 140-1-$m$ does not require a software update.

In one embodiment, the logic flow 300 may send a software update package from the provisioning server to the packet telephony device for installation on the packet telephony device at block 308. For example, when the client provisioning module 222 determines that the communications device 140-1-$m$ requires a software update, the client provisioning module 222 may send the appropriate software update package 132-1-$n$ to the requesting communications device 140-1-$m$ via the network interface 240.

From a device perspective, the communications device 140-1-$m$ may initiate provisioning operations by sending a provisioning request to the provisioning server 120. The communications device 140-1-$m$ may send its device configuration information with the provisioning request. When the requesting communications device 140-1-$m$ receives the software update package 132-1-$n$ from the provisioning server 120, the requesting communications device 140-1-$m$ may install the software update package 132-1-$n$. This may be accomplished using a local installer program or with a self-extracting installer.

Figure 4:
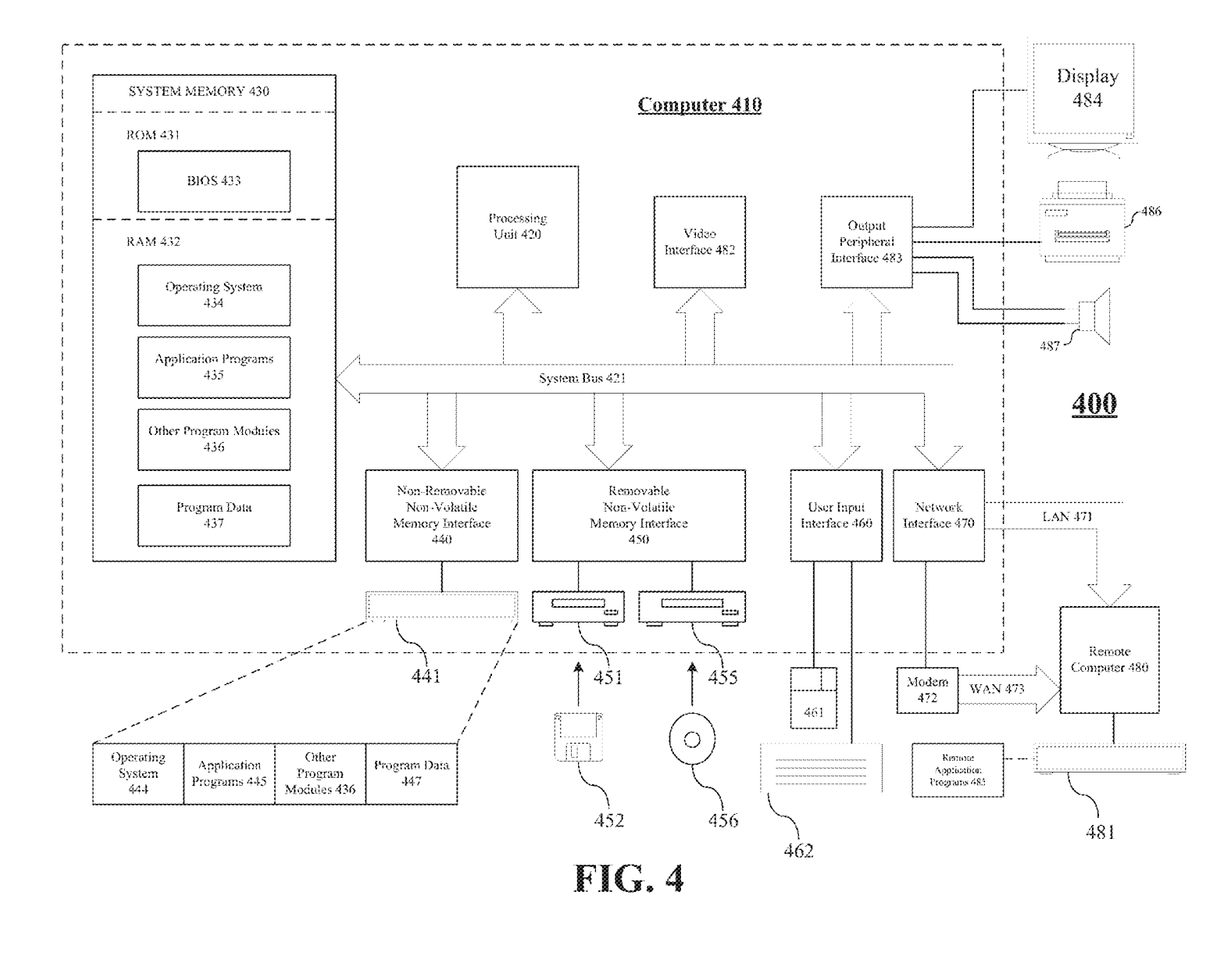
FIG. 4 illustrates one embodiment of a computing system architecture.

FIG. 4 illustrates a block diagram of a computing system architecture 400 suitable for implementing various embodiments, including the various elements of the communications system 100, such as the provisioning server 120, for example. It may be appreciated that the computing system architecture 400 is only one example of a suitable computing environment and is not intended to suggest any limitation as to the scope of use or functionality of the embodiments. Neither should the computing system architecture 400 be interpreted as having any dependency or requirement relating to any one or combination of components illustrated in the exemplary computing system architecture 400.

Various embodiments may be described in the general context of computer-executable instructions, such as program modules, being executed by a computer. Generally, program modules include any software element arranged to perform particular operations or implement particular abstract data types. Some embodiments may also be practiced in distributed computing environments where operations are performed by one or more remote processing devices that are linked through a communications network. In a distributed computing environment, program modules may be located in both local and remote computer storage media including memory storage devices.

As shown in FIG. 4, the computing system architecture 400 includes a general purpose computing device such as a computer 410. The computer 410 may include various components typically found in a computer or processing system. Some illustrative components of computer 410 may include, but are not limited to, a processing unit 420 and a memory unit 430.

In one embodiment, for example, the computer 410 may include one or more processing units 420. A processing unit 420 may comprise any hardware element or software element arranged to process information or data. Some examples of the processing unit 420 may include, without limitation, a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processing unit 420 may be implemented as a general purpose processor. Alternatively, the processing unit 420 may be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), an application specific integrated circuit (ASIC), and so forth. The embodiments are not limited in this context.

In one embodiment, for example, the computer 410 may include one or more memory units 430 coupled to the processing unit 420. A memory unit 430 may be any hardware element arranged to store information or data. Some examples of memory units may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), EEPROM, Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other medium which can be used to store the desired information and which can accessed by computer 410. The embodiments are not limited in this context.

In one embodiment, for example, the computer 410 may include a system bus 421 that couples various system components including the memory unit 430 to the processing unit 420. A system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and so forth. The embodiments are not limited in this context.

In various embodiments, the computer 410 may include various types of storage media. Storage media may represent any storage media capable of storing data or information, such as volatile or non-volatile memory, removable or non-removable memory, erasable or non-erasable memory, writeable or re-writeable memory, and so forth. Storage media may include two general types, including computer readable media or communication media. Computer readable media may include storage media adapted for reading and writing to a computing system, such as the computing system architecture 400. Examples of computer readable media for computing system architecture 400 may include, but are not limited to, volatile and/or nonvolatile memory such as ROM 431 and RAM 432. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF) spectrum, infrared and other wireless media. Combinations of the any of the above should also be included within the scope of computer readable media.

In various embodiments, the memory unit 430 includes computer storage media in the form of volatile and/or nonvolatile memory such as ROM 431 and RAM 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, application programs 435, other program modules 436, and program data 437.

The computer 410 may also include other removable/non-removable, volatile/nonvolatile computer storage media. By way of example only, FIG. 4 illustrates a hard disk drive 440 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4, provide storage of computer readable instructions, data structures, program modules and other data for the computer 410. In FIG. 4, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies. A user may enter commands and information into the computer 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus, but may be connected by other interface and bus structures, such as a parallel port, game port or a universal serial bus (USB). A monitor 484 or other type of display device is also connected to the system bus 421 via an interface, such as a video processing unit or interface 482. In addition to the monitor 484, computers may also include other peripheral output devices such as speakers 487 and printer 486, which may be connected through an output peripheral interface 483.

The computer 410 may operate in a networked environment using logical connections to one or more remote computers, such as a remote computer 480. The remote computer 480 may be a personal computer (PC), a server, a router, a network PC, a peer device or other common network node, and typically includes many or all of the elements described above relative to the computer 410, although only a memory storage device 481 has been illustrated in FIG. 4 for clarity. The logical connections depicted in FIG. 4 include a local area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other technique suitable for establishing communications over the WAN 473, such as the Internet. The modem 472, which may be internal or external, may be connected to the system bus 421 via the network interface 470, or other appropriate mechanism. In a networked environment, program modules depicted relative to the computer 410, or portions thereof, may be stored in the remote memory storage device. By way of example, and not limitation, FIG. 4 illustrates remote application programs 485 as residing on memory device 481. It will be appreciated that the network connections shown are exemplary and other techniques for establishing a communications link between the computers may be used. Further, the network connections may be implemented as wired or wireless connections. In the latter case, the computing system architecture 400 may be modified with various elements suitable for wireless communications, such as one or more antennas, transmitters, receivers, transceivers, radios, amplifiers, filters, communications interfaces, and other wireless elements. A wireless communication system communicates information or data over a wireless communication medium, such as one or more portions or bands of RF spectrum, for example. The embodiments are not limited in this context.

Some or all of the communications system 100 and/or computing system architecture 400 may be implemented as a part, component or sub-system of an electronic device. Examples of electronic devices may include, without limitation, a processing system, computer, server, work station, appliance, terminal, personal computer, laptop, ultra-laptop, handheld computer, minicomputer, mainframe computer, distributed computing system, multiprocessor systems, processor-based systems, consumer electronics, programmable consumer electronics, personal digital assistant, television, digital television, set top box, telephone, mobile telephone, cellular telephone, handset, wireless access point, base station, subscriber station, mobile subscriber center, radio network controller, router, hub, gateway, bridge, switch, machine, or combination thereof. The embodiments are not limited in this context.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
receiving a provisioning request by a provisioning server;
receiving device configuration information for a communications device, the device configuration information to identify an operating system, a locale and a language for the communications device, the communications device arranged to communicate voice information over a packet network;
analyzing the device configuration information in response to the provisioning request to determine whether the communications device requires a software update;
determining to provide the software update for the communications device based on the device configuration information; and
sending a software update package from the provisioning server to the communications device for installation on the communications device.

2. The method of claim 1, comprising receiving the device configuration information having type identification information and component version information for the communications device.

3. The method of claim 1, comprising receiving the device configuration information having type identification information for the communications device, the type identification information comprising a type identifier, a vendor identifier, a model identifier, a hardware revision identifier or a locale identifier.

4. The method of claim 1, comprising receiving the device configuration information having component version information for the communications device, the device configuration information comprising a file major version identifier, a file minor version identifier, a file build identifier or a file quick fix engineering identifier.

5. The method of claim 1, comprising retrieving the software update package corresponding to a type identifier for the communications device included with the device configuration information from a provisioning database.

6. The method of claim 1, the communications device arranged to communicate voice information over the packet network with a voice over internet protocol (VoIP) protocol.

7. An article comprising a computer readable storage medium containing instructions that when executed enable a system to:

receive a provisioning request for a provisioning server;
receive device configuration information for a communications device, the device configuration information to identify a current configuration of components in the communications device, the current configuration to include an operating system, a locale and a language, the communications device arranged to communicate voice information over a packet network;
analyze the received device configuration information in response to the provisioning request to determine whether the communications device needs a software update package for one of the components; and
determine to provide the software update package for the communications device based on the received device configuration information, wherein the determination is in response to the provisioning request.

8. The article of claim 7, further comprising instructions that when executed enable the system to determine whether to send a software update package to the communications device based on the device configuration information.

9. The article of claim 7, further comprising instructions that when executed enable the system to send a software update package from the provisioning server to the communications device for installation on the communications device.

10. The article of claim 7, further comprising instructions that when executed enable the system to receive the device configuration information having type identification information and component version information for the communications device.

11. The article of claim 7, further comprising instructions that when executed enable the system to receive the device configuration information having type identification information for the communications device, the type identification information comprising a type identifier, a vendor identifier, a model identifier, a hardware revision identifier or a locale identifier.

12. The article of claim 7, further comprising instructions that when executed enable the system to receive the device configuration information having component version information for the communications device, the device configuration information comprising a file major version identifier, a file minor version identifier, a file build identifier or a file quick fix engineering identifier.

13. The article of claim 7, further comprising instructions that when executed enable the system to retrieve the software update package corresponding to a type identifier for the communications device included with the device configuration information from a provisioning database.

14. A server, comprising:
a provisioning database arranged to store one or more software update packages;
a client provisioning module communicatively coupled to the provisioning database, the client provisioning module arranged to automatically provision a communications device in response to a provisioning request from the communications device, the communications device arranged to communicate voice information over a packet network, the client provisioning module to receive device configuration information to identify an operating system, a locale and a language for the communications device, and retrieve a software update package from the provisioning database based on the device configuration information; and
a network interface communicatively coupled to the client provisioning module, the network interface arranged to send a software update package to the communications device.

15. The server of claim 14, the device configuration information having type identification information for the communications device, the type identification information comprising a type identifier, a vendor identifier, a model identifier, a hardware revision identifier or a locale identifier.

16. The server of claim 14, the device configuration information having component version information for the communications device, the device configuration information comprising a file major version identifier, a file minor version identifier, a file build identifier or a file quick fix engineering identifier.

17. The server of claim 14, the communications device arranged to communicate voice information over the packet network with a voice over internet protocol (VoIP) protocol.

18. A method, comprising:
sending a provisioning request to a provisioning server;
sending device configuration information from a communications device to the provisioning server, the device configuration information to include an operating system, a locale and a language for the communications device, the communications device arranged to communicate voice information over a packet network;
receiving a software update package by the communications device from the provisioning server, the software update package to comprise a software update that is required for the communications device; and
installing the software update package on the communications device.

19. The method of claim 18, comprising installing the software update package on the communications device with a local installer program.

20. The method of claim 18, comprising installing the software update package on the communications device with a self-extracting installer.

* * * * *